United States Patent
Kumar (10) Patent No.: US 6,829,556 B2
(45) Date of Patent: Dec. 7, 2004

(54) METHOD AND SYSTEM FOR DETECTING INCIPIENT FAILURES IN A TRACTION SYSTEM

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/366,145

(22) Filed: Feb. 13, 2003

(65) Prior Publication Data

US 2004/0162696 A1 Aug. 19, 2004

(51) Int. Cl.$^7$ .................... H02H 7/00; G01R 31/14
(52) U.S. Cl. .................... 702/132; 361/24; 361/42; 324/510
(58) Field of Search .................. 324/509–511, 545, 324/557–58, 772; 361/23–25, 31, 42, 44, 115; 702/185, 132, 136, 183; 318/471

(56) References Cited

U.S. PATENT DOCUMENTS

| | | | |
|---|---|---|---|
| 4,370,692 A | | 1/1983 | Wellman, Jr. et al. |
| 4,549,241 A | | 10/1985 | Morris et al. |
| 4,608,619 A | | 8/1986 | Bomer et al. |
| 5,283,708 A | * | 2/1994 | Waltz ........................ 361/93.8 |
| 5,386,183 A | | 1/1995 | Cronvich et al. |
| 5,448,442 A | | 9/1995 | Farag |
| 5,528,444 A | | 6/1996 | Cooke et al. |
| 5,528,445 A | | 6/1996 | Cooke et al. |
| 5,574,387 A | | 11/1996 | Petsche et al. |
| 5,576,632 A | | 11/1996 | Petsche et al. |
| 5,640,103 A | | 6/1997 | Petsche et al. |
| 5,644,510 A | * | 7/1997 | Weir .......................... 702/132 |
| 5,675,497 A | | 10/1997 | Petsche et al. |
| 5,710,408 A | * | 1/1998 | Jones ......................... 219/481 |
| 5,784,232 A | * | 7/1998 | Farr .......................... 361/22 |
| 6,097,580 A | | 8/2000 | Zaretsky |
| 6,127,747 A | | 10/2000 | Halvorson |
| 6,243,628 B1 | | 6/2001 | Bliley et al. |
| 6,291,987 B1 | | 9/2001 | Dean et al. |
| 6,405,108 B1 | | 6/2002 | Patel et al. |
| 6,421,618 B1 | * | 7/2002 | Kliman et al. ................ 702/58 |
| 6,469,462 B2 | * | 10/2002 | Shimane et al. ............ 318/280 |

* cited by examiner

*Primary Examiner*—Marc S. Hoff
*Assistant Examiner*—Paul L Kim
(74) *Attorney, Agent, or Firm*—Senniger Powers Carl Rowold

(57) ABSTRACT

A method and system for operating an electrical system including an electrical machine to predict an incipient fault in the electrical machine. A neutral-to-ground leakage signal representative of current between a neutral point of the machine and an electrical ground is generated and stored in a memory. If the leakage signal exceeds a selected threshold, the electrical system is operated at a reduced power condition to control the current. Temperature criteria of the electrical system at which any moisture that could cause the high leakage current is determined with a temperature sensing system and the temperature is monitored and compared to the selected temperature criteria. The electrical system returns to operations at normal power conditions if the leakage signal returns to within the selected threshold. The leakage current signal information stored in the memory is analyzed to predict an incipient fault in the electrical system.

23 Claims, 5 Drawing Sheets

METHOD AND SYSTEM FOR DETECTING INCIPIENT FAILURES IN A TRACTION SYSTEM

BACKGROUND OF THE INVENTION

1. Field of the Invention

The invention relates generally to the field of electrical systems, and more particularly, the invention relates to methods and systems for incipient fault detection in traction vehicles, such as locomotives or transit vehicles.

2. Brief Description of the Prior Art

Locomotives and transit vehicles, as well as other large traction vehicles used for heavy haul applications, commonly use many high power electrical components such as alternators, dynamic braking grids, traction motors, blowers, and the like. These components fail due to various reasons, one of them being grounds typically caused by insulation degradation. For example, locomotives operate in an environment subject to constant freezing and thawing which degrades the insulation system by producing cracks in the electrical insulation. The traction drive system of a locomotive has many insulated windings, and excessive leakage current may develop between the drive system and the frame of the locomotive over time due to such things as aging, moisture, abrasions, dirt and the like. This is especially true for traction motors since moisture often gets into these components because of their proximity to the rail and the accessibility of environmental conditions. Failures due to excessive electrical leakage currents in an electrical system of locomotives are a leading cause of system shutdowns and mission failures.

Leakage current detectors are standard on many kinds of electrical equipment to protect the equipment from damage or to protect personnel from injury, and there is extensive industrial background on leakage current monitoring by traditional methods in ac systems. Ground faults may occur as a result of a fault in any of a number of different system components. In the context of a locomotive, such components include the propulsion drive system, batteries, and auxiliary equipment. Within the propulsion drive system, ground faults can occur in one or several components which include alternator, rectifier, cabling, traction motor, dynamic brake resistor, and blower motor.

However, many ground are transitory in nature. Often when a fault occurs, the portion of the electrical system is deactivated, and the locomotive is scheduled for repairs. However, once the locomotive is shopped for repairs, the system no longer exhibits abnormal grounds and the repairmen cannot identify the source of the fault. This is often caused because the excessive leakage current is caused by moisture in the electrical components. By the time the locomotive is shopped, the moisture has dried out, thus eliminating the high leakage currents. The amount of moisture that is able to penetrate the insulation system and result in high leakage currents often depends in part on the condition of the insulation system. A healthy system experiences relatively small change in leakage current as a result of changing moisture conditions, whereas a system with degraded insulation may experience large changes in leakage current that is moisture dependent. Furthermore, leakage current depends on the voltage level of the system, and conventional methods generally only provide sensitive protection when the voltage is at its highest level.

It is desirable to have early warning of insulation leakage development, in motors and drives for example, so that action may be taken before there is a failure. Ground faults resulting from insulation defects and deterioration generally develop over time, on the order of days, before they cause any damage, i.e., before the leakage current reaches a critical level. Commonly assigned U.S. Pat. No. 6,421,618 entitled Incipient Leakage Current Fault Detection Apparatus and Method issued Jul. 16, 2002 to Kliman et al., which is hereby incorporated by reference in its entirety, describes methods of measuring leakage current and predicting incipient faults in an electrical system. However the prior art is deficient in monitoring leakage current that may be moisture related and methods of operating the locomotive in such a way to minimize mission failures.

BRIEF DESCRIPTION OF THE INVENTION

It is therefore desirable to improve availability of leakage detection in electrical systems to enable incipient fault detection, and, in some cases, to continue operation of the electrical system if the leakage current is moisture related.

It is further desirable to reduce locomotive mission failures and reduce maintenance costs.

Briefly, according to one embodiment, the invention is a method for operating an electrical system including an electrical machine to predict an incipient fault in the electrical machine. The method includes generating a neutral-to-ground leakage signal representative of current between a neutral point of the machine and an electrical ground and storing the ground leakage signal in a memory. The method also includes determining temperature criteria of the electrical system and operating the electrical system at a reduced power condition if the leakage signal exceeds a selected threshold and if the selected temperature criteria is not met. The method also includes operating the electrical system at normal power conditions if the leakage signal is below the selected threshold. In a further embodiment, the method includes analyzing the stored ground leakage signals to predict an incipient fault in the electrical system. The method also can include terminating operation of the electrical system if the leakage signal exceeds the selected threshold and the temperature criteria are met.

According to another embodiment of the invention, the invention includes a system for predicting an incipient fault in an electrical machine of a locomotive. The system includes a leakage current detector capable of determining a neutral-to-ground leakage signal representative of current between a neutral point of the machine and an electrical ground and a memory storing the ground leakage signal. The system also includes a sensor for monitoring a temperature criteria of the electrical machine, and a processor responsive to the detector and sensor for preventing the operation of the locomotive at normal power conditions when the leakage signal exceeds a selected threshold and the temperature criteria is met.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawings in which:

DETAILED DESCRIPTION OF THE INVENTION

Figure 1:
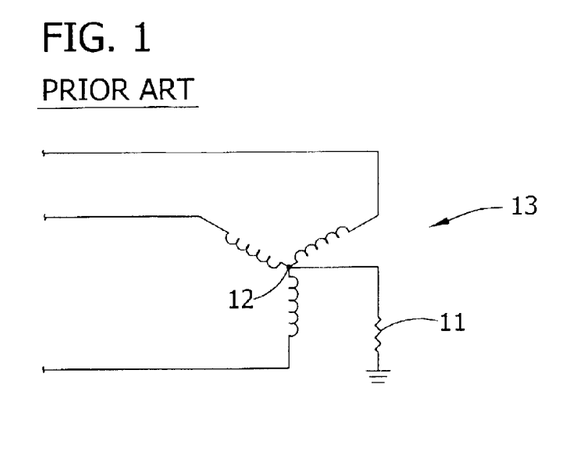
FIG. 1 is a prior art schematic circuit diagram illustrating a "Y" (wye) connected motor or generator with a current sensor including a resistor from neutral to ground for detecting leakage current.

One prior art form of leakage monitoring implementation is shown in FIG. 1, which illustrates utilizing a leakage current sensor 11, such as a resistor, from a neutral point 12 of a "Y" (wye) connected motor or generator 13 to ground. Current will flow in current sensor 11 whenever a ground develops anywhere else in a system connected to the motor or generator 13. This current is then monitored so that warnings or trips may be enabled when the leakage current reaches predetermined levels. Alternately, other forms of leakage current sensors as known to those skilled in the art may be used to measure leakage current. Additionally, although the description herein is primarily in terms of leakage current for purposes of example, the current is proportional to leakage voltage, so either current or voltage can be used as a leakage signal.

Figure 2:
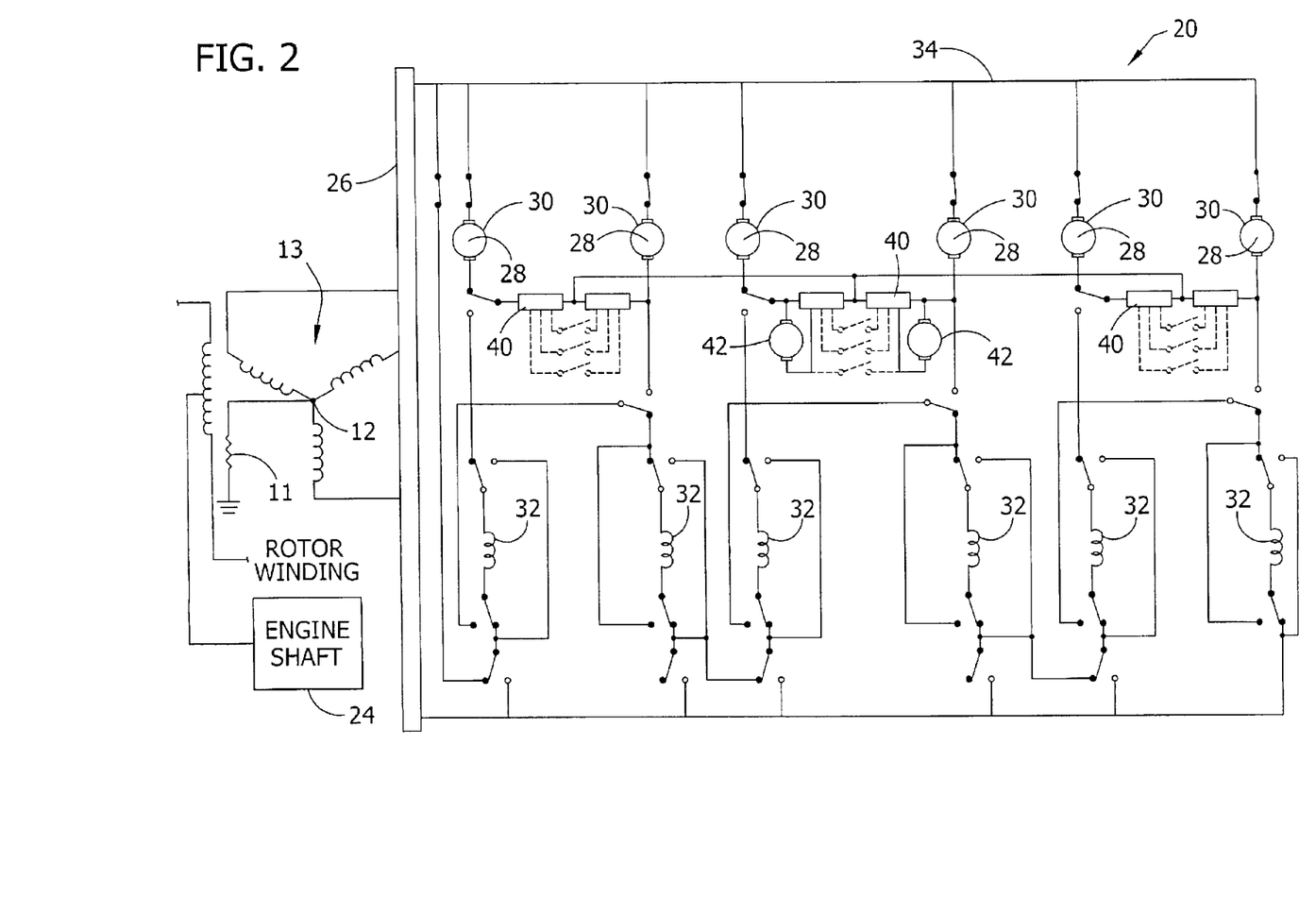
FIG. 2 is a schematic circuit diagram illustrating a propulsion drive system for a typical dc locomotive according to one preferred embodiment of the invention.

FIG. 2 is a circuit diagram of an electrical system which, for purposes of example, comprises a propulsion drive system, generally indicated at 20, for a typical dc drive locomotive. Propulsion drive system 20 comprises the three-phase machine 13 (which may comprise a motor or generator, for example, and in the locomotive embodiment of FIG. 2 comprises an alternator) driven by a prime mover such as a diesel engine 24. Tractive effort is modulated by varying the field, hence the voltage, of machine 13. The three phase voltages are then full-wave rectified by rectifier 26 to produce dc voltage. Traction motors 28 are usually series field dc traction motors with armatures 30 and main poles 32. There are typically four or six traction motors in a locomotive propulsion drive system 20, depending on the application, connected in parallel on a dc bus 34 across the rectified dc source. Leakage current is monitored as in FIG. 1 by sensor 11 connected between neutral 12 of machine 13 and the locomotive frame (ground in this embodiment) since such leakage in any part of the system must flow through sensor 11. The current that passes through sensor 11 is the leakage current.

FIG. 2 further illustrates braking grids 40 used for reversing or for braking of the drive system 20. The braking grids 40 are parallel resistors used to dissipate heat energy during dynamic braking of the locomotive. One or more blower motors 42 are also connected to the dc bus 34. The blower motors preferably have multiple speeds that provide cooling air circulation to the braking grids 40 and traction motors 28. Although the description of monitoring leakage current contained herein is described using the example of a propulsion drive system for a typical dc drive locomotive, it is contemplated, and one skilled in the art will understand, that the methods described below are also applicable to ac drive locomotive systems as the invention is not limited to a particular propulsion drive system context.

Figure 3:
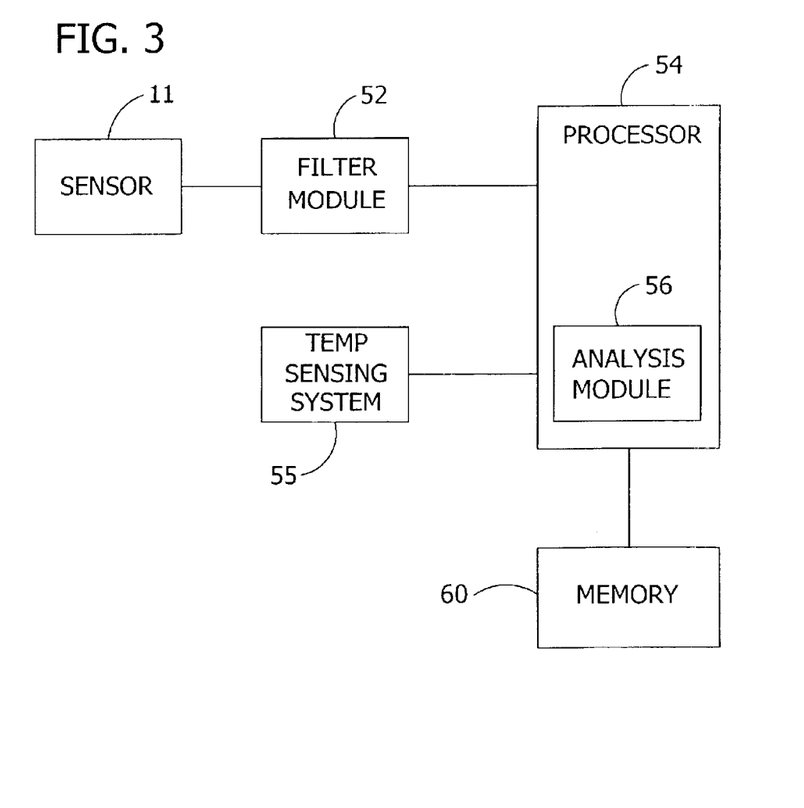
FIG. 3 is a block diagram illustrating a processor for monitoring the leakage current according to one preferred embodiment of the invention.

Referring now to FIG. 3, leakage current of the three phase machine 13 (FIG. 1) is measured with sensor 11, rectified and filtered by a rectifier/low pass filter module 52, and analyzed by a system processor 54 which may include an analysis/trending block 56. All measurements for deducing incipient ground faults start with the leakage current sensor 11 from the neutral of machine 13 to the frame (ground). The leakage current I is viewed in discrete samples that are separated by a predetermined time period T (in one embodiment T=30 minutes, for example). The leakage current I and other parameters indicative of the operating condition of the propulsion system 20, such as the voltage and notch setting, are stored in memory 60 as a function of the operating condition so that leakage current is compared a like operating conditions.

Figure 4:
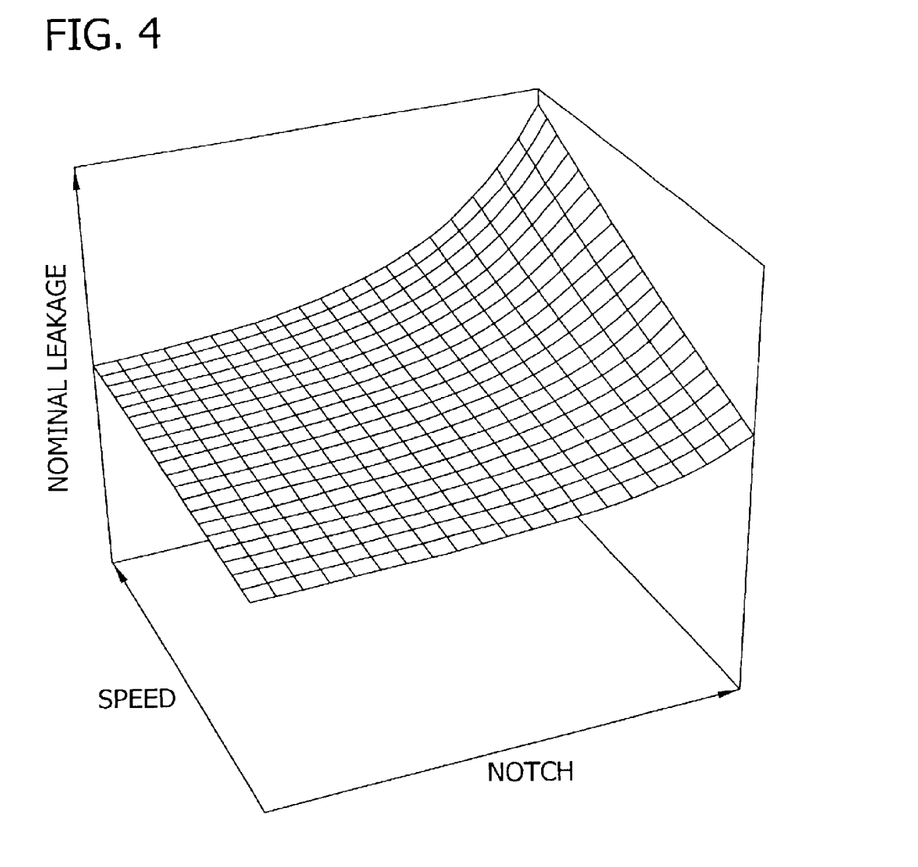
FIG. 4 is a graph illustrating the expected leakage current as a function of notch and speed.

In one embodiment, the leakage current is divided by an expected leakage current value for the operating conditions to obtain a normalized leakage current. As is understood by those skilled in the art, the expected leakage current is dependent on the voltage of the system. Accordingly, at higher notch settings, when voltage is higher, larger leakage currents are expected. In one example, the mean, maximum and minimum leakage currents are stored as a function of notch setting at various locomotive speed intervals. Nominal leakage currents are illustrated in FIG. 4. Maximum and minimum leakage currents can similarly be shown. A temperature sensing system 55 can be used to provide temperature readings of winding temperatures as will be more fully discussed below. In one embodiment, the temperature sensing system 55 uses a thermal model that receives input signals representative of the ambient temperature, air flow, current, voltage revolutions per minute (rpm) of the machine to predict temperature. Alternately, the temperature sensing system can use temperature sensors, such as any type of temperature sensor known to those skilled in the art.

Preferably, the raw data from the sensor 11 is cleaned (e.g., filtered or preprocessed) to reduce transient effects and noise from factors such as humidity, for example. Although not required, some type of filtering is useful to prevent transient effects from creating erroneous results in successive trending. Filtering can be performed for all data, or, in another embodiment, filtering is only performed if an independent source, such as a humidity sensor, for example, indicates that the data includes transient effects. For filtering, the raw data is formed into overlapping data filtering windows (preferably with no more than a twenty-five percent overlap). The length of each data-filtering window depends on the duration of the transient effect. For example, if it is raining, several hours worth of data may be useful. A "median trimming" technique can be used to remove outliers by computing the median of the data within the data filtering window and replacing a percentage, such as 10–20%, for example, of the extreme values, particularly large extreme values, by the median value.

It is preferable to detect the leakage current before it reaches a predetermined level, which in one embodiment, for example, is 400 ma. If the leakage current reaches the predetermined level, then an action such as a warning, alarm, or automatic shutdown may be performed. In one embodiment, there can be different levels of "faults". For example, fault logs/warnings can be generated by a current at one level (such as 400 ma, for example) and used to predict when the current may reach a second more dangerous level (such as 800 ma, for example). At the second level, the processor 54 can take a preventive action of reducing the voltage of machine 13. A third and higher level (such as 1600 ma, for example) can be used as a machine shutdown level. Additionally, long-term operations at a lower level (such as 800 ma) can require shutdown of the machine.

Figure 5:
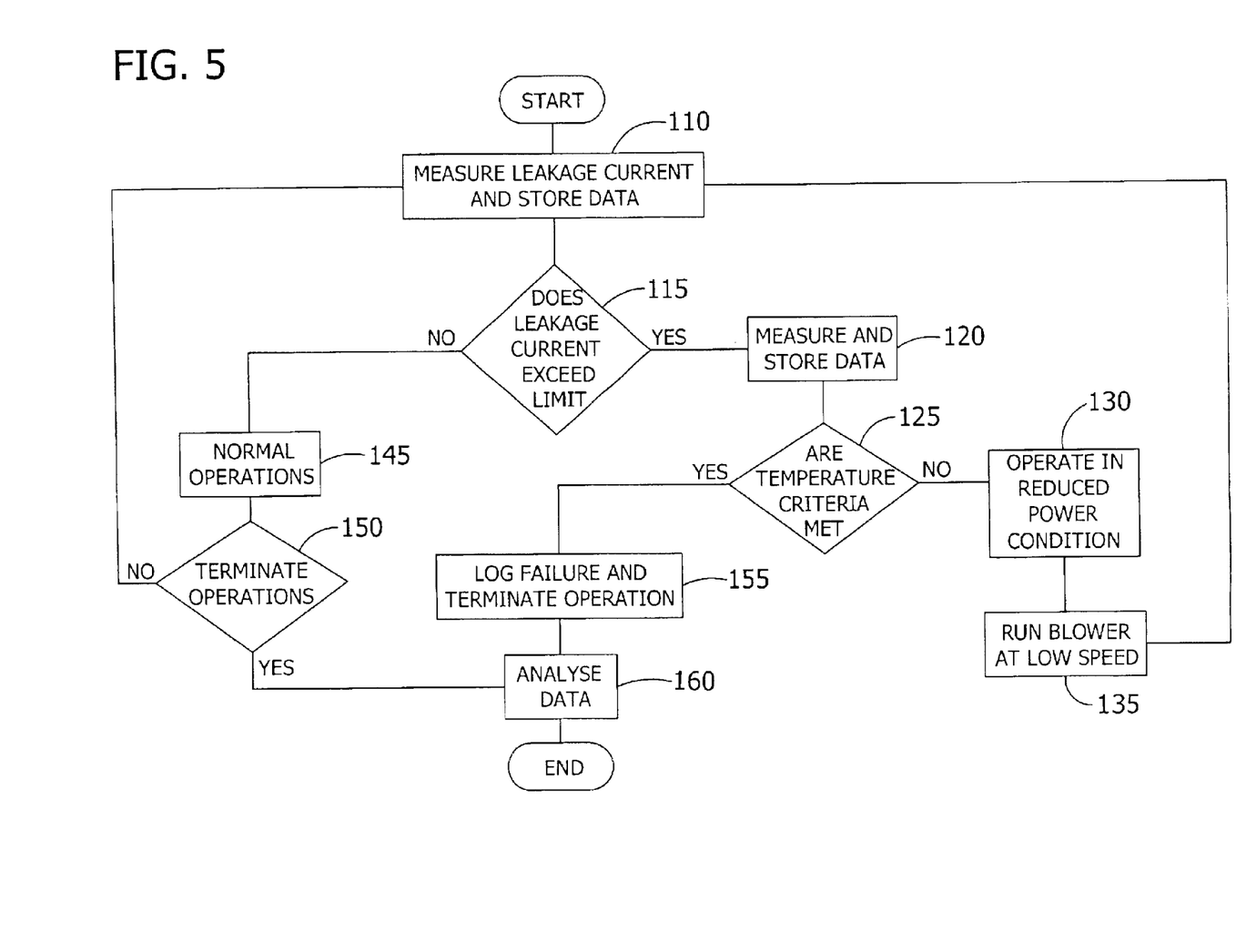
FIG. 5 is a flow chart illustrating a method of fault detection according to one preferred embodiment of the invention.

FIG. 5 is a flowchart illustrating techniques for incipient fault detection, and, in some cases, techniques for continued operation of the electrical system if the leakage current is moisture related. At step 110, the leakage current is measured as described above. The leakage current values, and preferably other data, such as the actual notch setting are recorded and stored in the memory 60. At step 115, the method determines if the leakage current exceeds an acceptable limit. This may be determined by the triggering of an alarm, a trip of a safety feature, or by the determination of an operator monitoring the leakage current that the leakage current exceeds the limit. If the leakage current exceeds the limit, the process proceeds to step 120, in which the temperature sensors 55 measure the selected temperature data. Preferably, the temperature data is stored in memory 60. At step 125, the process determines if pre-selected temperature criteria are met. Preferably the criteria are selected such that the temperature criteria should indicate that moisture should not be causing the high leakage current. The criteria may include one or more temperature conditions indicating that the traction motors and alternator are warmed up and operating at a temperature sufficient to dissipate any moisture. In one embodiment, the criteria include having the traction motor windings reach a pre-selected temperature. Preferably, the pre-selected temperature is between about 70 and 90 degrees Celsius, and more preferably about 80 degrees Celsius. The temperature should remain at or above at the pre-selected for a period of time (e.g., 2–3 minutes) long enough for moisture to evaporate. The criteria may also include the differential temperature between the windings and the ambient temperature. For example, the criteria may include having the winding temperature be above 50 degrees and the having the winding temperature minus the ambient temperature be greater than 40 degrees.

If the temperature criteria are not met in step 125, the locomotive is operated in a reduced mode of operation at step 130. This may include reducing the actual notch setting to a setting at which the leakage current is within acceptable limits. As explained above, reducing the notch setting reduces the voltage across the bus, resulting in an expected reduction in the leakage current. During the time that the traction motors are operated at reduced speeds, the actual notch setting may be incrementally increased as leakage current values allow. In step 135, the blower motors 42 are operated at a low speed setting. Running the blowers at low speed enables the windings to heat up faster, thereby dissipating any moisture that may be causing the excessive leakage currents. Preferably, the locomotive remains in the reduced operating state for a duration of time sufficient to allow the traction motors and alternator to heat up a sufficient amount to dissipate any moisture that may be causing the high leakage current.

The process returns to step 110 and the leakage current is again measured and compared to the selected limit. Preferably, the leakage current and other parameters are monitored at an increased frequency after the process determines that the leakage current has exceeded the selected limit. Preferably, the leakage current and related parameters are monitored and stored at a time interval T of between about 1 to 10 minutes, and more preferably at a time interval T of about 5 minutes. If at step 115 the leakage current within the selected limits, the locomotive proceeds to normal operations, as indicated by step 145. In step 160, maintenance personal review stored data obtained from the memory 60 for the leakage current history. The stored data is used to monitor the effectiveness of the electrical insulation in the propulsion system 20 and provide incipient traction system ground failure indication. Additionally, using the stored data, proper maintenance action can be scheduled or performed to remove or correct the failing component. Changes in the leakage current over a short period of time (e.g., 20–30 minutes) of greater than 20% when the locomotive operating conditions remain constant (i.e. same operating voltage), indicate that the leakage current is likely moisture related suitable maintenance can be scheduled.

If the process determines at step 125 that the temperature criteria are met and the leakage current exceeds the selected limit, a failure is logged at step 155 and the locomotive remains in restricted operations or the locomotive is deactivated as is known in the art.

Figure 6:
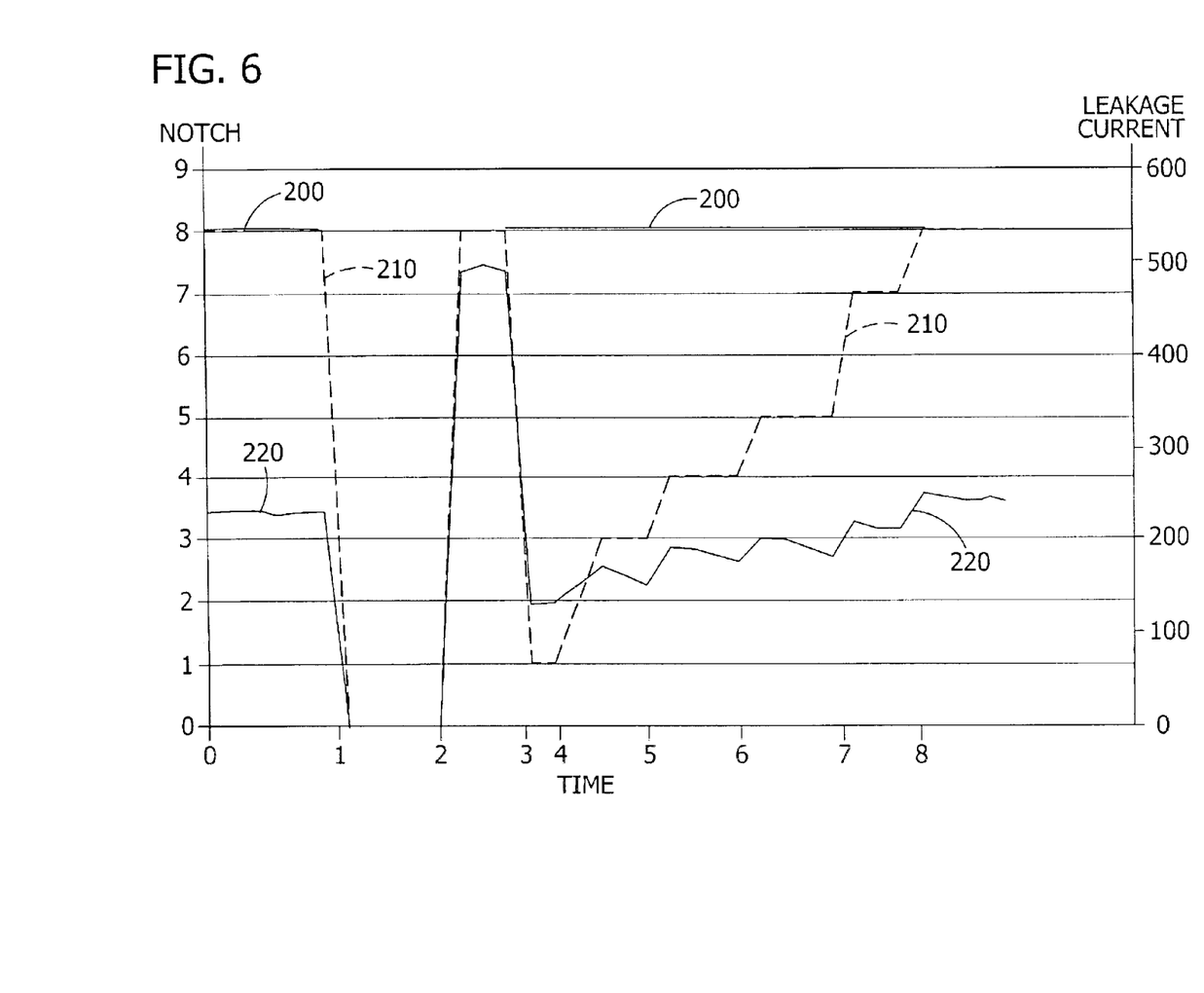
FIG. 6 is a plot of leakage current and notch setting vs. time according to the method of FIG. 5.

FIG. 6 illustrates a graph plotting the measured leakage current and the notch setting with respect to time while operating the locomotive according to one embodiment of the invention. The values for notch setting and leakage current are representative of values to illustrate operation of the locomotive according to the method described above. As such, one skilled in the art will understand that other values for notch setting and leakage current is possible. A line representing a commanded notch setting is indicated at 200. The commanded notch setting 200 is the notch setting required to deliver the required power from the traction motors to propel the locomotive at the desired speed. From time 0 to time 1, the commanded notch setting is notch 8. At time 1, the commanded notch setting is reduced to notch zero. At time 2, the commanded notch setting is returned to notch 8 and remains at notch 8 for the duration of the time plotted.

A line representing an actual notch setting is indicated at 210. From time 0 to time 1, the locomotive is traveling under normal operation and the actual notch setting is also notch 8, thereby meeting the commanded notch setting. A line representing the leakage current is indicated at 220. From time 0 to time 1, the leakage current 220 is within the operating band for normal operation. As shown, the leakage current is about 220 milliamps, which is an acceptable value for the notch setting. From time 1 to time 2, the actual notch setting 210 is reduced to zero and the leakage current 220 is also near zero. At time 2 the actual notch setting 210 is increased to 8 in response to the change in commanded notch setting 200. As illustrated, when the actual notch setting 210 is raised to 8, the leakage current 220 is higher than the normal operating band and exceeds an allowable limit. In response to the leakage current 220 exceeding the selected limit, at time 3 the actual notch setting 210 is reduced to notch 1. As illustrated, reducing the actual notch setting 210 has the desired effect of causing the leakage current 220 to fall to an acceptable level.

The locomotive is operated at the reduced actual notch setting 210 to allow the windings to heat up for a period of time. At time 4, the actual notch setting is raised to notch 3 and the leakage current is monitored. From time 4 to time 5, the leakage current falls as the moisture is evaporated as the windings heat up. At time 5, the actual notch setting is raised to notch 4. As expected, the leakage current 220 increases due to the higher notch setting, but the small increase in the notch setting 210 keeps the leakage current within acceptable levels. At times 6, 7, and 8, the actual notch setting 210 is incrementally raised until the actual notch setting again matches the commanded notch setting 200 while maintaining the leakage current 220 at acceptable levels.

This invention solves the longstanding problem of providing early warning of insulation leakage development, in motors and drives for example, so that action may be taken before there is a failure. Ground faults resulting from insulation defects and deterioration generally develop over time, on the order of days, before they cause any damage, i.e., before the leakage current reaches a critical level. Additionally, the method provides techniques the permit continued operation of the electrical system if the leakage current is moisture related.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

While various embodiments of the present invention have been illustrated and described, it will be appreciated to those skilled in the art that many changes and modifications may be made thereunto without departing from the spirit and scope of the invention. As various changes could be made in the above constructions without departing from the scope of the invention, it is intended that all matter contained in the above description or shown in the accompanying drawings shall be interpreted as illustrative and not in a limiting sense.

What is claimed is:

1. A method for operating an electrical system of a propulsion drive system for a vehicle including an electrical machine to predict an incipient fault in the electrical machine, comprising:
    generating a neutral-to-ground leakage signal representative of current between a neutral point of the machine and an electrical ground;
    sensing a temperature of the electrical system;
    determining if the sensed temperature exceeds a temperature criteria of the electrical system, said temperature criteria corresponding to a temperature condition indicating that the electrical system is operating at a temperature and for a period of time which dissipates any moisture;
    operating the electrical system at a reduced power condition if the leakage signal exceeds a selected threshold and the sensed temperature does not exceed the temperature criteria; and
    operating the electrical system at normal power conditions if the leakage signal is below the selected threshold.

2. The method of claim 1 further comprising analyzing the stored ground leakage signals to predict an incipient fault in the electrical system.

3. The method of claim 1 further comprising terminating operation of the electrical system if the leakage signal exceeds the selected threshold and the temperature criteria is met.

4. The method of claim 1 further comprising logging a failure if the leakage signal exceeds the selected threshold when the temperature criteria is met.

5. The method of claim 1 further comprising operating a blower motor at a reduced speed until the temperature criteria is met.

6. The method of claim 1 wherein the temperature criteria comprises a minimum temperature of a traction motor winding.

7. The method of claim 6 wherein the minimum temperature is about 80 degrees C.

8. The method of claim 1 wherein the temperature criteria comprises a minimum temperature differential between a traction motor winding temperature and ambient temperature.

9. The method of 1 wherein the electrical system is an electrical system of a locomotive.

10. The method of claim 9 operating in a reduced power condition comprises operating the locomotive at a reduced notch setting.

11. A method for operating an electrical system of a locomotive having at least one traction motor machine to predict an incipient fault caused by moisture penetrating insulation of the traction motor, the method comprising:
    generating a neutral-to-ground leakage signal representative of current between a neutral point of the machine and an electrical ground;
    determining temperature criteria of the electrical system;
    operating the electrical system at a reduced power condition if the leakage signal exceeds a selected threshold and if the Selected temperature criteria is not met;
    operating the electrical system at normal power conditions if the leakage signal is below the selected threshold; and
    terminating operation of the electrical system if the leakage signal exceeds the selected threshold and the temperature criteria is met.

12. The method of claim 11 further comprising logging a failure if the leakage signal exceeds the selected threshold when the temperature criteria is met.

13. The method of claim 11 further comprising operating a blower motor at a reduced speed until the temperature criteria is met.

14. The method of claim 11 wherein the temperature criteria comprises a minimum temperature of a traction motor winding.

15. The method of claim 14 wherein the minimum temperature is about 80 degrees C.

16. The method of claim 11 wherein the temperature criteria comprises a minimum temperature differential between a traction motor winding temperature and ambient temperature.

17. A system for predicting an incipient fault in an electrical machine of a locomotive, the system comprising:
    a leakage current detector capable of determining a neutral-to-ground leakage signal representative of current between a neutral point of the machine and an electrical ground;
    a sensor for monitoring a temperature criteria of the electrical machine, said temperature criteria corresponding to a temperature condition indicating that the electrical system is operating at a temperature and for a period of time which dissipates any moisture; and
    a processor responsive to the detector and sensor for preventing the operation of the locomotive at normal power conditions when the leakage signal exceeds a selected threshold and the sensed temperature meets or exceeds the temperature criteria.

18. A method for operating an electrical system of a propulsion drive system including an electrical machine to predict an incipient fault in the electrical machine, comprising:
    measuring a leakage signal representative of current between a neutral point of the machine and an electrical ground;
    storing the measured leakage signal in a memory as a function of operating conditions, said operating conditions including an operating voltage of the electrical system wherein the operating voltage is indicative of a temperature of the electrical system;
    analyzing the stored leakage signals measured at substantially the same operating voltages to define a trend in the leakage signals over a period of time; said trend identifying a change in magnitude of the leakage signals over the period of time;

predicting an incipient fault in the electrical equipment based on the defined trend.

19. The method of claim 18 further comprising determining whether a corrective action is required to the electrical system as function of the defined trend.

20. The method of claim 19 further comprising prompting an operator to initiate corrective action when the defined trend identifies a change in magnitude of the leakage signals exceeds a selected threshold.

21. The method of claim 20 wherein the corrective action includes performing maintenance on the electrical system.

22. The method of claim 20 including operating the electrical system at normal power conditions if the identified change in magnitude of the leakage signals is below the selected threshold; and operating the electrical system at reduced power conditions if the identified change in magnitude of the leakage signals is above the selected threshold.

23. A method for operating an electrical system of a propulsion drive system including an electrical machine to predict an incipient fault in the electrical machine, comprising:

measuring a first leakage signal representative of current between a neutral point of the machine and an electrical ground when the electrical system is operating at an operations voltage, wherein the operating voltage is indicative of a temperature of the electrical system;

storing the first measured leakage signal in a memory;

measuring a second leakage signal representative of current between a neutral point of the machine and an electrical ground after a predetermined time period and while the electrical system is operating at substantially the same operating voltage;

storing the second measured leakage signal in a memory;

comparing magnitudes of the stored first and second leakage signals to determine if a change between the first leakage signal and the second leakage signal exceeds a selected threshold, and prompting an operator to initiate corrective action when the determined change exceeds a selected threshold.

* * * * *